(12) United States Patent
Nurse et al.

(10) Patent No.: US 6,842,119 B2
(45) Date of Patent: Jan. 11, 2005

(54) DETECTING DAMAGE TO A STRUCTURAL MEMBER

(75) Inventors: Andrew David Nurse, Loughborough (GB); Lee Edward Jan Styger, Burton on Trent (GB)

(73) Assignee: J. C. Bamford Excavators, Limited, Uttoxeter (GB)

( * ) Notice: Subject to any disclaimer, the term of this patent is extended or adjusted under 35 U.S.C. 154(b) by 104 days.

(21) Appl. No.: 10/411,444

(22) Filed: Apr. 10, 2003

(65) Prior Publication Data

US 2003/0222784 A1 Dec. 4, 2003

(30) Foreign Application Priority Data

Apr. 12, 2002 (GB) .............................................. 0208447

(51) Int. Cl.[7] .............................................. G08B 21/00
(52) U.S. Cl. ........................ 340/685; 52/118; 212/348
(58) Field of Search ............................... 340/679, 680, 340/685; 52/117, 118; 212/347, 348

(56) References Cited

U.S. PATENT DOCUMENTS

| 3,815,116 A | 6/1974 | Fink ........................ 340/267 C |
| 4,546,652 A | 10/1985 | Virkar et al. .................. 73/776 |
| 4,660,729 A * | 4/1987 | Carbert ........................ 212/278 |
| 5,834,942 A * | 11/1998 | De Angelis ................. 324/522 |

FOREIGN PATENT DOCUMENTS

| EP | 0785163 | 7/1997 | |
| FR | 2556833 | 6/1985 | |
| GB | 1389139 | 4/1975 | |
| GB | 2029019 | 3/1980 | |
| GB | 2193825 | 2/1988 | |
| GB | 2294112 | 4/1996 | |
| JP | 200-302377 | 10/2000 | |
| JP | 2000296992 A * | 10/2000 | ........... B66C/23/90 |
| JP | 2003292289 A * | 10/2003 | ........... B66C/23/90 |
| WO | WO 82/03454 | 10/1982 | |

* cited by examiner

*Primary Examiner*—Jeffery Hofsass
(74) *Attorney, Agent, or Firm*—MacMillan, Sobanski & Todd, LLC

(57) ABSTRACT

A method of detecting damage to a structural member which is part of a working arm of a working apparatus, which arm is moveable relative to a body of the apparatus by an actuator. In use, the arm carries a load at another end thereof. The method including the steps of locating in or on the structural member in a position which is liable to damage, at least one filament. So long as the filament remains undamaged, a signal is transmitted along the length of the filament. In the event of an interruption of the transmitted signal, a fault signal is generated. The fault signal is used to disable operation of the actuator. The method is particularly useful for working arms made from light weight composite materials in the form of a matrix of fibers in a resin material which is susceptible to impact damage which may not be visible.

10 Claims, 2 Drawing Sheets

DETECTING DAMAGE TO A STRUCTURAL MEMBER

CROSS-REFERENCE TO RELATED APPLICATIONS

Priority is claimed to British patent application Serial No. 0208447.3 filed Apr. 12, 2002.

STATEMENT REGARDING FEDERALLY SPONSORED RESEARCH OR DEVELOPMENT

Not Applicable.

TECHNICAL FIELD

The invention related to a method for detecting damage to a boom or other structural member during use.

BACKGROUND OF THE INVENTION

This invention relates to a method of detecting damage, such as impact damage which may occur to a structural member in use, the structural member being a part of a working arm, e.g. a boom or boom section of a working apparatus such as load handling machine of the kind which in use may travel over the ground to carry loads. Examples of such machines are so called telescopic loaders in which the boom includes a plurality of telescopically extendible and retractable sections, although the invention may be applied to other working apparatus.

Particularly where such booms are made of materials other than metal, which readily deform upon impact with sufficient force, the boom may not readily visually reveal damage, e.g. when impacted, even though such damage may well be critical to the safe continued use of the machine.

BRIEF SUMMARY OF THE INVENTION

According to one aspect of the invention we provide a method of detecting damage to a structural member which is part of a working arm of a working apparatus. The arm is moveable relative to a body of the apparatus by an actuator. In use, the arm carries a load at an outer end thereof. The method including the steps of locating a filament in or on the structural member in a position which is liable to damage, detecting the transmission of a signal along the filament, generating a fault signal in the event of a disruption to signal transmission, and providing the fault signal to a disabling device which disables actuator operation. A fault signal will be generated in the event of damage occurring to the filament and the actuator is disabled to prevent further, potentially dangerous, working operations being carried out.

In one embodiment the filament may be adhered to the structural member so that the invention may be applied even to a metal boom. More particularly though where the structural member is made at least predominantly of a composite material being a matrix of fibers in a resin material, the method may include embedding the filament in the composite material during fabrication of the structural member. Thus the filament may be an integral part of the structural member construction and thus may be readily damaged to disrupt signal transmission along the filament. The signal transmission disruption detected may be a total or partial disruption of signal transmission.

Preferably the filament is embedded in the composite material at or adjacent a surface of the structural member so that surface damage which may be most safety critical, can be detected. The signal which is transmitted along the filament may be one of a light signal, a sonic or ultrasonic signal and an electrical signal. The fault signal when generated may additionally be used to provide a warning to an operator of the working apparatus.

The invention may be applied for detecting especially impact damage as may occur during use of the working arm. Thus the working arm may be a boom or boom section of a working apparatus which is load handling machine of the kind which carries the load at an outer end thereof; in or on a load handling implement. The boom is mounted at or towards an inner end, on a body of the load handling machine which is movable over the ground on a ground engaging structure.

The structural member may be made at least predominantly of composite material being a matrix of fibers in resin. The filament may be embedded in the composite material during fabrication of the structural member. Where the structural member is elongate, the filament may extend longitudinally of the member over a substantial proportion of its length. The boom may include a plurality of telescopic or otherwise relatively moveable sections, at least one of the boom sections having the filament therein or thereon in a position which is liable to impact damage.

The working apparatus may include a signal transmitter for transmitting the signal along the filament with a detector detecting the transmission of the signal along the filament, and a control apparatus which in response to the detector, generates the fault signal.

It will be apparent that various objects and advantages of the invention will become apparent from the following detailed description of the invention and the accompanying drawings.

DETAILED DESCRIPTION OF THE INVENTION

Figure 1:
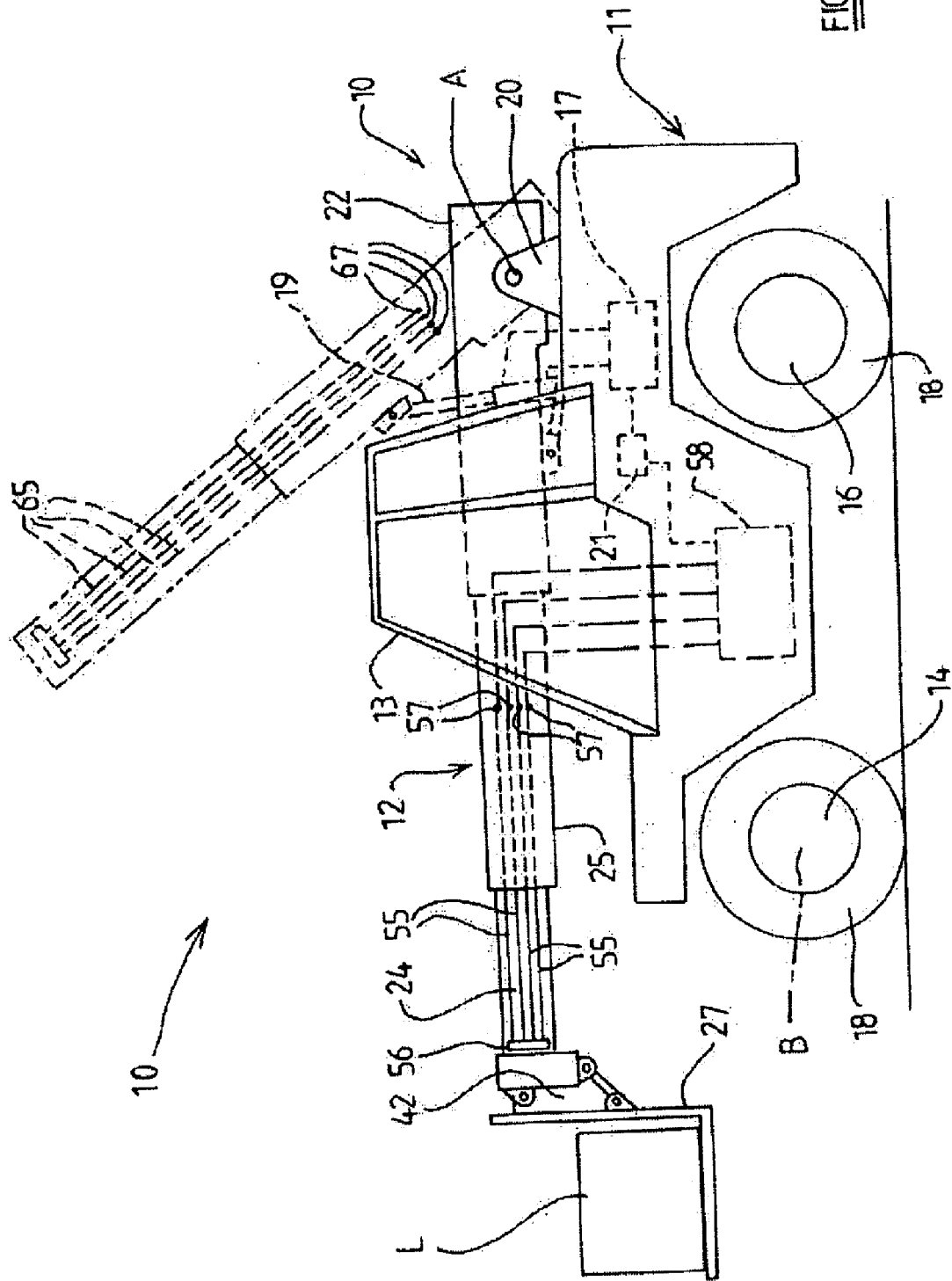
FIG. 1 is a side elevational view of an exemplary load handling machine adopted for performance of the method of the invention.

Referring to the drawings, an exemplary working apparatus, which is a load handling machine 10, includes a body 11 which has an operator's cab 13 at one side thereof, and a working arm in the form of a loading boom 12 at another side. The boom 12 is mounted on the body 11 for pivotal movement about a generally horizontal boom mounting axis A behind the cab 13. The boom 12 extends forwardly from the mounting axis A alongside the cab 13 and forwardly of the cab 13 and body 11. The body 11 of the machine 10 is provided with a ground engaging structure which in this example includes a front axle 14, and a rear axle 16, each axle 14, 16 carrying wheels 18.

The boom 12 is mounted on the body 11 for pivotal movement about the axis A, at a mounting 20 which in this example is rearwardly of the cab 13. A first hydraulic actuator 19, in this example, acts between the body 11 and boom 12 to raise and lower the boom 12 relative to the body 11. The actuator 19 is operated by an operating apparatus 17 which in this example, is a hydraulic circuit, which is controlled from within the cab 13.

The exemplary boom 12 is a three section boom 12. An innermost first section 22 is mounted on the body 12, a second outermost boom section 24 which in use carries a load L in or on a load handling implement 27 (e.g. loading forks) at or towards its outermost end, and an intermediate boom section 25. The three sections 22, 24 and 25 telescope, as hereinafter described, so that the boom 12 is extendible and retractable to move the load handling implement 27 towards and away from the body 11. In FIG. 1 the boom 12 is shown in full lines at a typical low position, with the boom partially 12 retracted, although the boom 12 may be lowered further than shown by the actuator 19, and further retracted. In dotted lines the boom 12 is shown in a raised condition (without the load L).

It will be appreciated than in the dotted line condition, with a full load L on the load handling implement 27, there will be a tipping moment about an axis B of the front axle 14 which tends to tip the machine 10 about the wheel axis B. Regardless of the strength of the boom 12, there is a restriction on the load L which can be handled which varies with boom extension and height.

The innermost first boom section 22 is made of metal and supports not only the load L, but the second and intermediate boom sections 24, 25 too. The second outermost boom section 24 is preferably made of a lighter composite material namely a material which is a matrix of fibers in a resin. The composite material may be a fiber matrix of for example, glass and/or carbon and/or aramid fibers, in a resin, such as epoxy, polyester or vinyl esters. The fibers of the matrix may be aligned along and/or around the boom section 24 for optimal strength. It can be seen that the outermost composite boom section 24 in this example is of generally rectangular cross section and having an internal hollow H. However the boom section 24 may be of other configurations, as hereinafter described.

The cross section of the boom section 24 is smaller than that of the intermediate section 25 which also is of generally rectangular hollow cross section, and the outermost boom section 24 is received in telescopic fashion, within the hollow of the intermediate boom section 25. The outermost boom section 24 telescopes in and out relative to the intermediate boom section 25, by a second actuator (not shown), e.g. a hydraulic actuator, which is mounted within the hollow of the at least the intermediate boom section 25, and is secured to the outermost second boom section 24. The second actuator is also operated by the operating apparatus 17 and controlled from within the cab 13.

It will be appreciated that the second boom section 24, being made of a composite material, is susceptible to wear as the section 24 slides in and out of the intermediate boom section 25. Although wear pads 28 may be provided at the four external corners of the second boom section 24 at an innermost end 29 of the section 24, as is conventional in the art, the corners of the boom section 24 may well rub on internal surfaces of the intermediate boom section 25 during relative sliding. Furthermore, when the second boom section 24 is loaded, the problem of wear of the composite material of the boom section 24 will be exacerbated.

Preferably, elongate bearing members 30 are provided at each of the external corners of the second boom section 24. The bearing members 30 in this example extend over a substantial portion of the length of the boom section 24. The bearing members 30 are made from a suitably hard material, such as for examples of steel or another metal, or a hard plastic material such as nylon. The bearing members 30 in this example are in the form of angle strips which extend over a part of a top 31 or bottom 32 web, and a part of a respective side web 33 or 34, to protect the corners of the second boom section 24 during sliding of the boom section 24 within the intermediate boom section 25.

Figure 2:
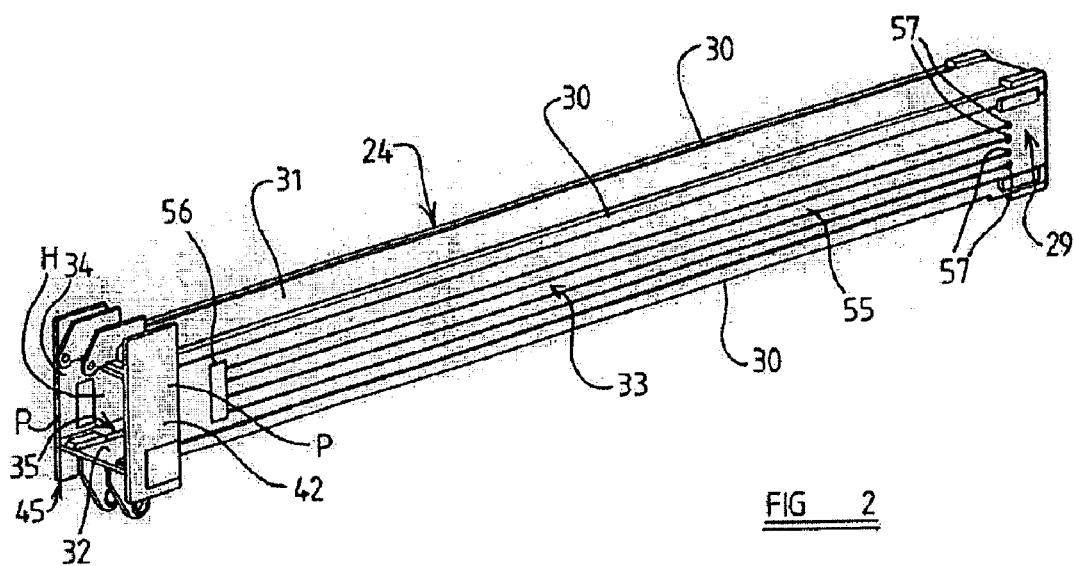
FIG. 2 is a perspective view from a side of a part of the boom of the machine of FIG. 1.
Figure 3:
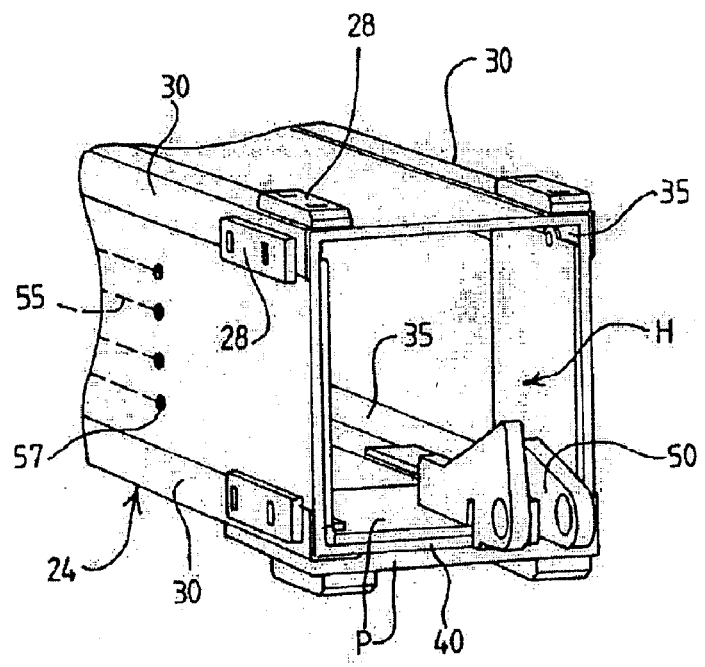
FIG. 3 is an enlarged fragmentary end perspective view of the boom of FIG. 1

The intermediate boom section 25 may be made or metal or composite material as desired. To provide minimum weight, and thus increase the load which the machine 12 can handle, it is preferable if the intermediate boom section 25 is also made of a composite material. In this case, to protect the intermediate boom section 25 from wear as the outermost second boom section 24 slides in and out of the intermediate boom section 25, the intermediate boom section 25 may be provided with interior bearing members 35, again of angle section and made of metal or at least of a material harder than the composite material. For the purposes of illustration the outermost second boom section 24 shown in FIGS. 2 and 3, is shown provided with such interior bearing members 35 although these would not be required for providing wear resistance as no further boom section slides inside the outermost boom section 24, but these may be provided for other purposes too, as hereinafter described.

The first innermost boom section 22 is also generally rectangular in this example dimensioned so as to receive in telescoped fashion therein, the intermediate boom section 25. Thus, the exterior corners of the intermediate boom section 25 may be provided with bearing members, to give wear protection as the intermediate boom section 25 slides in and out of the first boom section 22. In each case the bearing members 30, 35 may be fixed to the composite material either by bonding with a suitable bonding agent, and/or fasteners, which where interior 35 and exterior 30 bearing members are provided may pass through the composite material and be fixed to the bearing members 30, 35 so as to sandwich the composite material between the bearing members 30, 35. Alternatively or additionally to either of those methods, the bearing members 30, 35 may be laid up with the composite material of the boom section 24 (and 25) when the boom is made, the bearing members 30, 35 having formations which become integrated with the composite material and thus affixed relative thereto during molding.

It will be appreciated that in use, the bearing members 30, 35 help to transmit forces experienced primarily in the top 31 and bottom 32 webs of the rectangular boom section 24 (and 25), to the side webs 33, 34 and thus distributing loads over the whole boom 12 structure. If desired, additional bearing members may be provided elsewhere on the boom section 24 (and 25) where wear is likely to be experienced. These additional bearing members, and the exterior bearing members 30 and interior bearing members 35 where provided, as well as providing wear protection may perform other functions.

It will be appreciated that composite material is more prone than metal to becoming damaged, for example, as a result of impact. Moreover, whereas a metal section would visibly dent, damage of a composite section can be invisible to the naked eye, as such impacts may result in internal disruption of the structure only. The exterior bearing members 30 at least, being made of harder material than the composite material of the boom section 24 (and 25) will afford the composite material protection against impact damage at the corners of the boom section 24 (and 25) which are perhaps most prone to such impact damage.

The bearing members 30, 35 also provide surfaces for the attachment of fittings to the composite boom section 24, 25, such as for examples only, actuator mountings, one of which is shown in FIG. 3 at 40 at the inner end 29 of the boom section 24, and/or the load handling implement 27 mounting 42. Such mountings may include plates P which span the respective top 31, bottom 32 and side webs 33, 34 so as to be connectable to at least two bearing members 30, 35.

In the FIG. 2 view, it can be seen that the loading implement 27 mounting 42 is generally rectangular in cross section and extends around the exterior of the boom section 24 at an outermost end 45 thereof. The mounting 42 interconnects with all four exterior bearing members 30.

In the FIG. 3 view, at the innermost end 29, the actuator mounting 50 has plates P which extend interiorly and exteriorly of the bottom web 32 of the boom section 24, sandwiching the composite material therebetween, each interior and exterior plate P interconnecting respectively, the two lower bearing members 35, 30. Wear pads 28 at the innermost end 29 of the boom section 24 are attached to the bearing members 30 too. It will be appreciated that bearing members 30, 35 of other configurations may be provided particularly where the boom 12 is of another configuration. For example, the composite boom section 24 (and 25), and even the metal boom section 22 may be round, elliptical, triangular or of another cross sectional configuration as desired.

The innermost first boom section 22 may be made of a composite material. Whereas such a composite innermost first boom section 22 may require bearing interior members only to provide wear protection as the intermediate boom section 25 slides in and out, exterior strips may be provided to facilitate providing the mounting 20 at mounting axis A, and/or a mounting for the actuator 19 which raises and lowers the boom 12.

In the examples described, the bearing members 30, 35 extend along the respective boom section 22, 24, 25 preferably from end to end. If desired the bearing members may extend along a part of the length only, for example in a region where bearing support for the composite material is desired. For one example only, the exterior and interior bearing members 30, 35 for the outermost boom section 24 may be provided locally of the respective end of the boom section 24 only, to provide support for the loading implement mounting or the actuator mounting in those regions only.

It will be appreciated that whereas the exemplary machine 10 has a three section boom 12, if desired the boom may have only two sections, or more than one intermediate section.

As mentioned above, boom 12 sections 24, 25 are prone to impact damage in use as the machine 10 moves over the ground on the ground engaging structure 14, 16, 18. A metal boom when subjected to sufficient impact, will dent/deform and thus provide a visual indication of such damage, particularly safety critical damage. However, a boom 12 such as that described with at least one section 24 which is made of a composite material, may not readily reveal to the eye that even safety critical damage has occurred.

In accordance with the invention, there are provided a plurality of fiber optic filaments 55 which in this example extend generally longitudinally along the elongate section 24. As used herein, the term "on" for describing the location of the filaments 55 on the section 24 shall mean either on a wall surface of the section 24 or embedded in the wall of the section 24. The filaments 55 enable damage within the composite structure of the outermost boom section 24 to be detected, particularly impact damage. The filaments 55 are embedded in the composite material as the boom section 24 is laid up and fabricated. The filaments 55 are distributed around the cross section of the boom section 24, close to the surface of the composite, particularly at the boom sides 33, 34 where impact damage is most likely to occur during use. Each filament 55 is connected at one end to a light transmitter 56, which may be embedded in the composite material, and in use, a light signal is transmitted along each fiber optic filament 55 to a respective light detector 57.

In the event that the boom section 24 suffers damage, particularly impact damage, for example if the machine 10 is moved so as to collide the boom section 24 with a side positioned obstacle, at least one of the filaments 55 is likely to become damaged or severed, with the result that light will no longer be transmitted or fully transmitted along the filament. This disruption in light transmission will be detected by the respective detector 57 and as a result the detector 57, or a control apparatus 58 to which each of the detectors 57 is connected, may generate a fault signal.

Impact damage of a composite structural member may be unnoticeable to the eye as impact forces may be transmitted from the surface to the structure beneath. Thus by providing the filaments 55 adjacent to but just below the surface, transmitted impact forces which may have caused internal structural damage to the boom section 24, will be detected when the filament or filaments 55 are damaged. The fault signal may be intelligently produced so that the particular filament or filaments 55 which is/are damaged can be identified so that a careful inspection. The inspection may involve techniques to examine the structure of the boom section 24 below the surface. The inspection can be limited to the part of the boom section 24 in which damage is detected.

In accordance with the invention, the fault signal is used by the control apparatus 58 to disable for example, the first actuator 19 which raises and lowers the boom 12, and or to disable the internal second actuator which is used to extend/retract the boom section 24, with the boom section 24 retracted into the intermediate boom section 25, so that the damaged outer boom section 24 is supported by the intermediate boom section 25. This disabling of the actuator is achieved by the control apparatus 58 providing the fault signal to a disabling device 21 which disables the actuator by interrupting or otherwise shutting down the operating apparatus 17. In addition to or alternatively, upon impact damage being detected, the control apparatus 58 may generate an audible and/visual alarm.

It will be appreciated that particularly for other configuration of structural members, the filament or filaments 55 may be located in alternative appropriate positions where damage potentially may occur. Thus the filament or filaments need not extend only longitudinally of the structural member (boom section 24) as shown and described, but may extend around the structural member or otherwise.

In the example of the drawings as shown on the dotted line raised position boom 12, the intermediate boom section 25 is also provided with embedded fiber optic filaments 65 which are connected to a respective light transmitter 66 and respective individual detectors 67, so that damage occurring to the composite intermediate boom section 25 may also be detected. In this example, because the innermost boom section 22 is less liable than the intermediate and outermost boom sections 25, 24 to impact damage, this boom section 22 is not provided with any fiber optic or other damage detecting filament.

Although the invention has been described in relation to a composite material structural member 24, the invention may be applied to structural members made of other materials such as for example, metal structural members, particularly hollow members, which may be located where visual inspection of the member for damage may not be convenient or possible. In this case, rather than embed the filament or filaments within the metal of the structure, the filament(s) may be adhered along and or around the structural member e.g. on the surface of the member 24.

In the example described, all of the filaments 55 are connected to a common light source 56, but in another argument, each filament 55 or groups of filaments may have their own light sources. In the example described, the filaments 55 extend along the boom 24 but may in another example be provided in a matrix of interconnecting filaments 55 to cover a greater boom area 24. In the example described, the filament 55 is an optic fiber along which a light signal is transmitted provided the filament is undamaged. However, in another example the filament 55 may be, for example an electrical conductor, and an electrical signal is transmitted along the filament. Thus there may be an electrical detector to detect the transmission of electricity along the filament, with changes in resistance of the conductor indicating damage to the filament and hence to the structural member in or on which the conductor is provided. In yet another embodiment, the signal transmitted along a filament may be a sonic or ultrasonic signal, with there being an appropriate detector to detect any disruption to signal transmissions occurring as a result of structural damage.

Although the invention has been described in relation to a load handling machine 10 having a working arm 12 which is a boom, the invention may be applied to other kinds of working apparatus, such as excavators having excavating arms rather than loading booms.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of detecting damage to a structural member which is part of a working arm of a working apparatus, which arm is moveable relative to a body of the apparatus by an actuator, the arm in use, carrying at an outer end thereof, a load, the method including the steps of: providing a filament on the structural member at a location which is liable to damage; transmitting a signal along the filament during use of the structural member; generating a fault signal in the event of a disruption to signal transmission along the filament; and disabling operating of the actuator in response to a fault signal.

2. A method according to claim 1, and wherein the filament is provided by adhering the filament to the structural member.

3. A method according to claim 1, and wherein the structural member is made at least predominantly of a composite material being a matrix of fibers in a resin material, and the filament is provided by embedding the filament in the composite material during fabrication of the structural member.

4. A method according to claim 3, and wherein the filament is provided by embedding the filament in the composite material at or adjacent a surface of the structural member.

5. A method according to claim 1, and wherein the signal which is transmitted along the filament is selected from the group consisting of a light signal, a sonic or ultrasonic signal, and an electrical signal.

6. A method according to claim 1, and further including the step of providing a warning to an operator of the working apparatus in response to a fault signal.

7. A method according to claim 1, and wherein the filament is provided to extend longitudinally of the structural member over a substantial proportion of the length of the structural member.

8. A method according to claim 1, and further including the steps of providing a signal transmitter for transmitting the signal along the filament, and providing a detector for detecting the transmission of the signal along the filament, and providing a control apparatus which generates the fault signal in response to the detector.

9. A method of detecting damage to a boom section of a telescopic boom on a load handling machine of the kind which carries a load at an outer end of said boom, which boom section is moveable by an actuator relative to the load handling machine, said load handling machine being moveable over the ground on a ground engaging structure, the method including the steps of: providing filaments on the boom section at locations which are susceptible to damage during use; transmitting a signal along each filament during use of the load handling machine; generating a fault signal in the event of a disruption to signal transmission along the filament;

and disabling operating of the actuator in response to a fault signal.

10. A method according to claim 9, wherein filaments are provides on each boom section which is susceptible to damage during use at such locations which are susceptible to impact damage during use.

\* \* \* \* \*